United States Patent [19]

Strahan et al.

[11] 4,403,144
[45] Sep. 6, 1983

[54] FIBER OPTIC ACCELEROMETER

[75] Inventors: Virgil H. Strahan, Orange; Kenneth A. James, Corona Del Mar; William H. Quick, La Habra Heights, all of Calif.

[73] Assignee: Rockwell International Corporation, El Segundo, Calif.

[21] Appl. No.: 157,694

[22] Filed: Jun. 9, 1980

Related U.S. Application Data

[62] Division of Ser. No. 928,222, Jul. 26, 1978, Pat. No. 4,239,963.

[51] Int. Cl.$^3$ .............................................. G01D 5/34
[52] U.S. Cl. ........................... 250/231 R; 250/237 G; 73/655
[58] Field of Search ............... 250/231 R, 237 G, 227; 340/347 P; 73/651, 653, 654, 655, 656, 657, 517 R, 517 AV

[56] References Cited

U.S. PATENT DOCUMENTS

| | | | |
|---|---|---|---|
| 2,351,955 | 6/1944 | Graf | 250/231 R |
| 3,289,777 | 12/1966 | Willyard | 250/231 R |
| 4,071,753 | 1/1978 | Fulenwider et al. | 250/231 R |
| 4,218,614 | 8/1980 | Miller | 73/655 |

*Primary Examiner*—David C. Nelms
*Attorney, Agent, or Firm*—H. Fredrick Hamann; Morland C. Fischer

[57] ABSTRACT

An inexpensive, light weight fiber optic accelerometer to convert input mechanical motion (e.g. acceleration) into digitized optical output signals. The output of the accelerometer may be connected directly to data processing apparatus without the necessity of space consuming analog to digital interface means.

14 Claims, 7 Drawing Figures

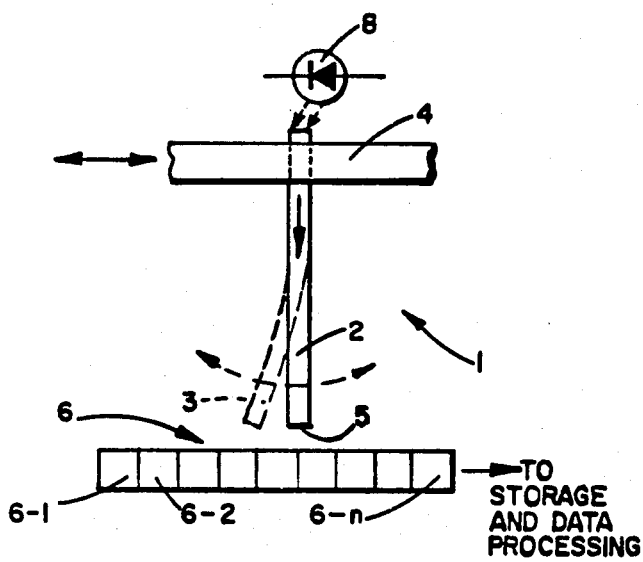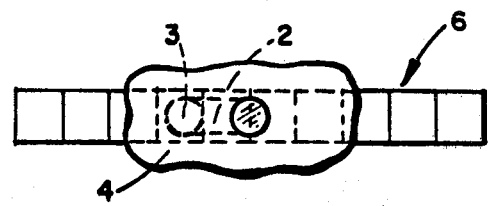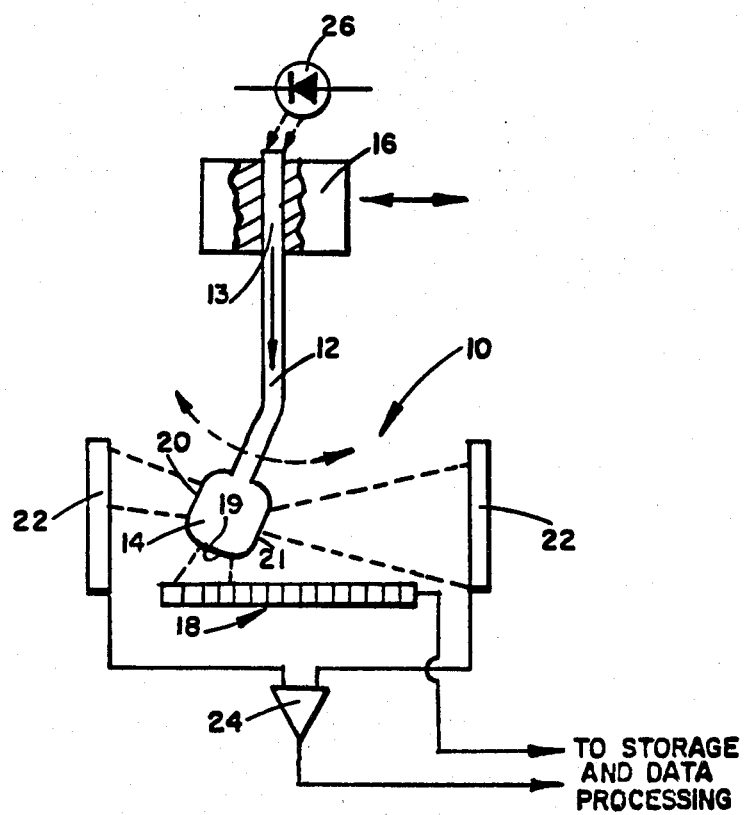

FIBER OPTIC ACCELEROMETER

The invention described herein was made in the performance of work under NASA Contract No. NAS3-21005 and is subject to the provisions of section 305 of the National Aeronautics and Space Act of 1958 (72 Stat. 435; 42 U.S.C. 2457).

This patent application is a division of application Ser. No. 928,222, filed July 26, 1978, now U.S. Pat. No. 4,239,963.

BACKGROUND OF THE INVENTION

1. Field of the Invention

This invention relates to a fiber optic accelerometer which converts input mechanical motion into digitized optical output signals.

2. Prior Art

As is known to those skilled in the art, conventional prior art accelerometers typically provide an analog output signal that is representative of an input mechnical force. Therefore, should a digital representation be required (such as when it is desirable to interface with a microprocessor, or the like), space consuming analog to digital conversion apparatus must be employed.

By fabricating an accelerometer with fiber optics, sensed input mechanical signals may be converted directly to optical signals which will, thereby, eliminate many electrical to optical and optical to electrical interfaces. Moreover, a fiber optic accelerometer could be characterized as being inexpensive to manufacture, light weight, capable of carrying wide bandwidth signals and immune to electromagnetic and electrostatic interferences relative to conventional accelerometers.

Examples of patents which disclose fiber optic apparatus for detecting input mechanical forces are as follows:

U.S. Pat. No. 3,146,057—Aug. 25, 1964
U.S. Pat. No. 3,449,587—June 10, 1969
U.S. Pat. No. 3,602,036—Aug. 31, 1971

SUMMARY OF THE INVENTION

Briefly, and in general terms, a fiber optic accelerometer is disclosed. In a first embodiment of the invention, one end of an elongated, flexible fiber optic rod is suspended from a support structure. A light source is located in proximity to the first, suspended end. The second, free end of the fiber optic rod is positioned adjacent a segmented light sensor. Input acceleration forces applied to the support structure are transmitted to the second, free end of the fiber optic rod, causing said free end to oscillate. Incident light is transmitted from the source thereof through the fiber optic rod so that the instantaneous position of the free end of the rod can be detected by the light sensor.

In another embodiment of the invention, first ends of a first bundle of fiber optic rods are connected to a light focusing means, such as a lens. A light source is located in proximity to the second ends of the first bundle of rods. First and second masks are each coded with a plurality of grating patterns to perform the function of converting input acceleration forces into digital output signals. The first mask is formed on a substrate that is movable in response to the input acceleration forces that are applied to the accelermeter. The second mask is formed on a substrate that is stationary relative to the first substrate. The substrates are aligned in substantially parallel planes adjacent the lens. First ends of a second bundle of fiber optic rods are connected to the stationary mask so that incident light from the source thereof is transmitted therethrough via the first bundle of fiber rods, the lens, and the first and second masks. The second ends of the second bundle of fiber rods are connected to signal processing means so that a digital representation of the input acceleration forces can be obtained depending upon the positions of the coded movable and stationary masks relative to one another.

BRIEF DESCRIPTION OF THE DRAWINGS

FIG. 1 shows an accelerometer comprising a suspended fiber optic rod that forms one embodiment of the present invention.

FIG. 2 is a top plan view of FIG. 1.

FIG. 3 shows an accelerometer comprising a suspended fiber optic rod having a fused sphere formed on the free end thereof, said accelerometer forming another embodiment of the present invention.

DESCRIPTION OF THE PREFERRED EMBODIMENT

Figure 4:
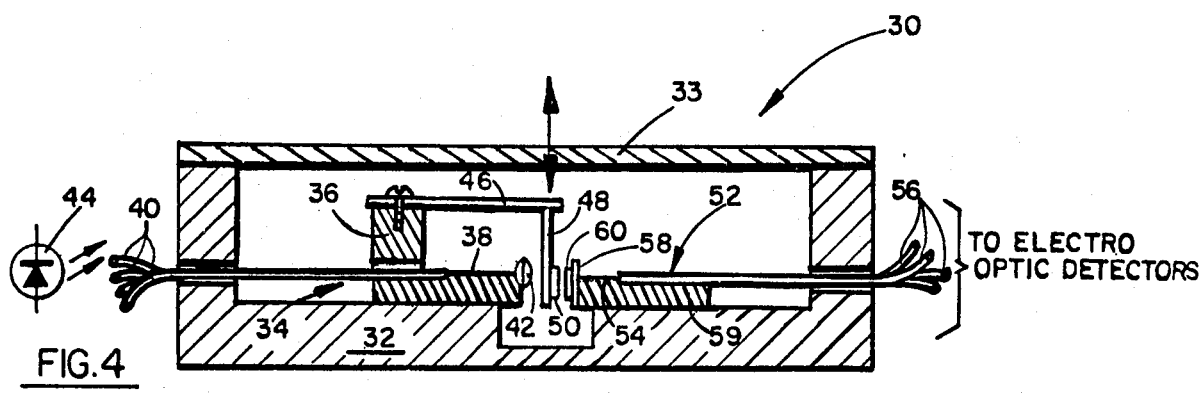
FIG. 4 shows an accelerometer that includes both movable and stationary masks, which accelerometer forms yet another embodiment of the present invention.

FIGS. 1 and 2 of the drawings illustrate a rugged, inexpensive accelerometer 1 which converts input mechanical motion (e.g. acceleration) into digitized optical output signals and forms one embodiment of the present invention. The accelerometer 1 comprises an elongated, flexible optical fiber rod 2 that is fabricated from a well known light-conducting material such as, for example, optical glass or plastic. The optical fiber rod 2 may be either of a single mode or multimode type. One end of optical fiber 2 is suspended from a supporting structure 4. The free end 3 of optical fiber 2 is positioned adjacent a suitable light sensor 6. The tip of the free end 3 of fiber rod 2 may consist of, for example, a cleavage plane 5, a tapered section to increase resolution at the sensor, or a fused sphere to obtain broad, bur efficient, light coupling with the sensor.

By way of example, the light sensor 6 may be a segmented charge coupled device (CCD) comprised of a linear array of light cells 6-1 . . . 6-n. In a preferred embodiment of the invention, three identical sensors 6 are utilized in conjunction with three respective fiber rods 2, each of which rods being constrained to oscillate in a single plane. The sensors can efficiently mesure all of the components of motion when they are positioned orthogonally relative to one another and to three unidirectional fiber rods. However, it is also to be understood that a suitable area detector having a pair of fiber rods and a corresponding pair of sensors to measure two dimensional motion may also be employed herein.

A suitable source of either coherent or incoherent light, such as an incoherent light emitting diode source 8 is positioned adjacent the suspended end of the fiber rod 2. Incident light is transmitted from the source 8 thereof through the fiber rod 2, so that the instantaneous position of the free end 3 of rod 2 can be recorded by the cells which comprise the light sensor 6.

In operation, mechanical forces (i.e. acceleration) are applied to the supporting structure 4. The mechanical forces are transmitted from the supporting structure 4 to the suspended end of fiber rod 2 so that the free end 3 thereof fibrates like a mechanical tuning fork. The free end 3 of the fiber rod 2 flexes or bends as a function of both the acceleration forces that are applied to the supporting structure 4 and the dynamics of the rod 2. The cells 6-1 . . . 6-n of the light sensor 6 are responsive to discrete position changes of the incident light transmitted through the fiber rod 2 during the course of the motion of the free end 3 thereof. Conventional storage and data processing means (not shown) may be interfaced with the light sensor 6 so that finite amounts of data regarding the acceleration forces transmitted to the fiber rod 2 can be stored for a predetermined time interval and then erased, when desired. Hence, the fiber optic accelerometer 1 is suitable to supply information which can be stored to describe the vibrational forces acting on machinery or the acceleration forces acting upon a vehicle (e.g. an airplane) for a period of time prior to a crash or a breakdown.

FIG. 3 of the drawings illustrates a rugged, inexpensive accelerometer 10 having a differential light detector which converts input mechanical motion to digitized optical output signals and forms another embodiment of the present invention. The accelerometer 10 is a variation of the accelerometer 1 disclosed while previously referring to FIGS. 1 and 2. The accelerometer 10 comprises an elongated flexible optical fiber rod 12 that is fabricated from a well known light-conducting material. One end 13 of the optical fiber rod 12 is suspended from a supporting structure 16. A suitable source of either coherent or incoherent light, such as a light emitting diode 26 is positioned adjacent the suspended end 13 of the fiber rod 12. The free end 14 of fiber rod 12 is positioned adjacent a suitable light sensor 18. The free end 14 of fiber rod 12 comprises a multiport terminal for light that is transmitted thereto via rod 12. The multiport light terminal may be fabricated, for example, by heating the free end 14 of rod 12 to form a fused sphere. Although a spherical shape is described, it is to be understood that this is for illustrative purposes only. The free end 14 of rod 12 may be formed into any other suitable geometrical shape to maximize sensor coupling. The bottom and side surfaces 19, 20 and 21 of the fused sphere are polished. Moreover, reflective coatings may also be applied to surfaces 19, 20 and 21 so as to enhance sensor sensitivity. Polished bottom surface 19 is positioned adjacent the light sensor 18. By way of example, light sensor 18 may be a segmented charge coupled device (CCD) comprising a linear array of light cells, such as that described while referring to FIGS. 1 and 2, above. Each of a pair of conventional light amplitude detectors 22 is respectively aligned with one of polished side surfaces 20 and 21 of the sphere. A differential amplifier 24 is connected between the pair of light amplitude detectors 22 so as to provide an amplified output signal that is indicative of the difference in light signals received by the detectors 22. In a preferred embodiment of the invention, three pairs of light amplitude detectors 22 and three differential amplifiers 24 are utilized in conjunction with three respective fiber rods 12, the free ends 14 of which being constrained to oscillate in a single plane. Three dimensional measurements of the components of the acceleration forces that are applied to the fixed support 16 can be obtained by arranging the three unidirectional fiber rods 12 and the corresponding detectors 18 and 22 in an orthogonal configuration relative to one another.

In operation, incident light is transmitted vertically through fiber rod 12 from the source 26 to the free end 14 thereof, so that the initial position or reference zero point of the fiber rod 12 can be determined by the cells which form the light sensor 18. The zero point is used to account for subsequent changes in the fiber rod 12 and in its associated dynamics. Mechanical forces (i.e. acceleration) are applied to the supporting structure 16. The mechanical forces are transmitted from the supporting structure 16 to the suspended end 13 of fiber rod 12 so that the free end 14 thereof oscillates in a single plane. The position of the fiber rod 12 in the plane of oscillation is a function of both the acceleration forces that are applied to supporting structure 16 and the dynamics of rod 12. The pair of light amplitude detectors 22 are particularly sized in order to determine the instantaneous position of the free end 14 of rod 12 by calculating the difference in amplitude of the two output light signals emanating from polished side surfaces 20 and 21 at the fused sphere. The amplitude of the light signals received by detectors 22 is dependent upon the amount of bend in the flexible fiber optic rod 12 and the corresponding reflection of the transmitted incident light at the fused free end 14 thereof.

Conventional storage and data processing means (not shown) may be interfaced with the light sensor 18 and the differential amplifier 24 so that finite amounts of data regarding the acceleration forces that are transmitted to supporting structure 16 and to fiber rod 12 can be either stored for a predetermined time interval, read out, or erased, when desired. The rate of data storage can be keyed to respond to any sudden changes in acceleration forces that are applied to the support structure 16. Hence, like the accelerometer 1 described in FIGS. 1 and 2, the presently disclosed fiber optic accelerometer 10 is suitable to supply information which can be stored to describe the vibration and acceleration forces acting upon machinery or a vehicle for a period of time prior to a breakdown or a crash.

Referring to FIG. 4 of the drawings, another fiber optic accelerometer 30 is shown which converts input mechanical motion (e.g. acceleration) to digitized optical output signals. The fiber optic accelerometer 30 includes a casing 32 having a top member 33. The casing 32 and the top member 33 may be formed from any suitable, light weight material such as aluminum, or the like. A first bundle of light conducting fiber optic rods 34 extends through respective openings formed in one end of the accelerometer casing 32 and in a support block 36. In a preferred embodiment of the invention, the first bundle includes six to ten fiber optic rods 34. As is known to those skilled in the art, each of the fiber rods 34 comprises a flexible, transparent inner core 38 and an outer cladding or sheath 40 that is formed over the fiber core 38 so as to protect the core and to maintain the integrity of the light transmissive characteristics thereof. The fiber optic cores 38 may be fabricated from optical glass or any suitable plastic material. The respective cladding 40 of each fiber rod 34 is stripped away to expose one end of the corresponding inner core 38. The exposed first ends of the fiber cores 38 are connected to a suitable light focusing means such as, for example, a cylindrical lens 42. The second end (not shown) of each of the fiber cores 38 is connected to receive a suitable supply of light such as that supplied, for example, by a light-emitting diode 44. Hence, light that is caused to enter one end of any fiber core 38 is conducted by internal reflection to its opposite end and to the lens 42 independently of the other fiber cores which comprise the first bundle of fiber optic rods 34.

An elongated, flexible plate-like spring member 46 is connected at one end thereof to the top of the support block 36. Spring member 46 may be fabricated from suitable spring steel or quartz, when high stability is required. The second end of the spring member 46 is connected to a transparent substrate 48, whereby the position of substrate 48 is dependent upon the input acceleration forces that are applied to spring member 46. The substrate 48 is located adjacent cylindrical lens 42 so as to receive a line of light that is transmitted thereto via fiber rods 34. Substrate 48 includes a mask 50 formed on one side thereof. The structure and operation of mask 50 will be described in greater detail hereinafter.

A second bundle of light conducting fiber optic rods 52 extends through an opening formed in the other end of the accelerometer casing 32. Each of the fiber rods 52 comprises a flexible, transparent inner core 54 and an outer cladding or sheath 56. Fiber rods 52 are similar to the fiber optic rods 34 which form the first bundle thereof. The second bundle also includes six to ten fiber optic rods 52. The respective cladding 56 of each fiber rod 52 is stripped away to expose one end of the corresponding inner core 54. The exposed first ends of fiber cores 54 are connected to a transparent substrate 58. Substrate 58 is connected to a support block 59 so that the position of substrate 58 is stationary relative to that of substrate 48. Substrate 58 includes a mask 60 formed on one side thereof. Substrates 48 and 58 are initially positioned adjacent one another so that the respective masks 50 and 60 thereof oppose one another in substantially parallel planes. The second end (not shown) of each of the fiber cores 54 is respectively connected to a conventional electro-optic detector. The electro-optic detectors are interfaced with suitable processing electronics (also not shown) so that output signals transmitted via the second bundle of fiber optic rods 52 may be sensed or stored for further utilization in a well known fashion.

The respective masks 50 and 60 are formed by any suitable technique such as, for example, by the deposition of a photographic emulsion on each of the substrates 48 and 58. The respective masks 50 and 60 are provided with a suitable code to perform the function of converting the input mechanical motion that is applied to spring member 46 to digital output signals. One well known code that may be utilized to perform the desired mechanical motion to digital signal conversion is that known as a Gray code.

Figure 5A:
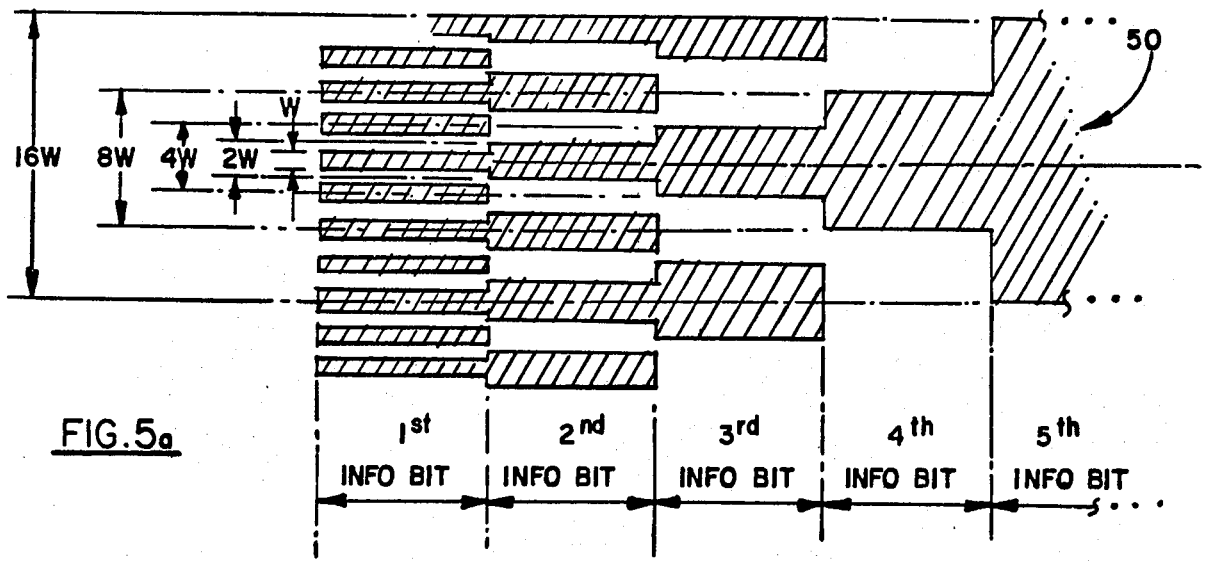
FIGS. 5a and 5b show detailed illustrations of the coded grating patterns which form the respective movable and stationary masks of the accelerometer illustrated in FIG. 4.
Figure 5B:
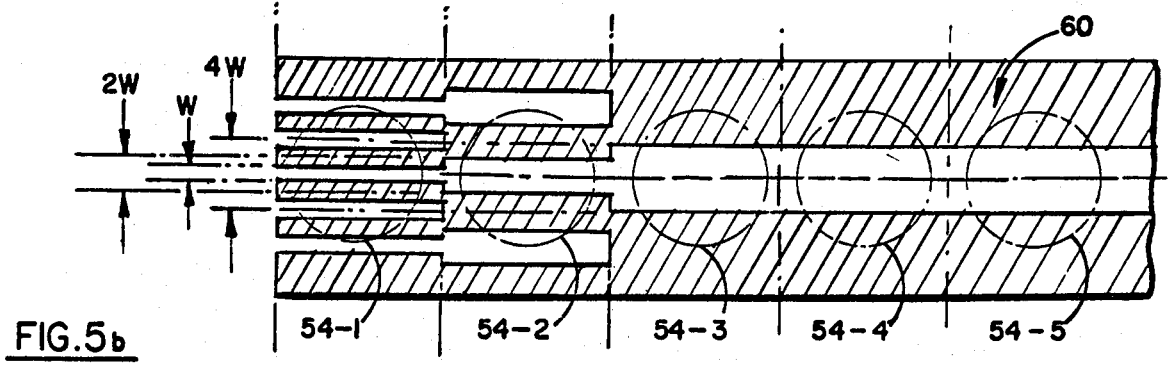

More particularly, the mask 50 that is formed on the movable, spring connected substrate 48 is provided with a code that is illustrated in FIG. 5a. The mask 60 that is formed on the stationary substrate 58 is provided with a code that is illustrated in FIG. 5b. As is known to those skilled in the art, the Gray code that is produced by the interaction of masks 50 and 60 is mechanized by means of the formation of adjacent arrays of gratings having bars and slits arranged in masks 50 and 60 in order to provide a plurality of alternately spaced light and dark areas. Each information bit of the digitized output signal is represented by a respective grating pattern and by the presence or absence of light that is transmitted from light supply 44 to a corresponding fiber core (e.g. 54-1, 54-2, 54-3, 54-4 and 54-5) through masks 50 and 60.

Referring concurrently to FIGS. 4 and 5a, the mask 50 formed on the movable substrate 48 is described in detail. The first information bit of mask 50 consists of a plurality of open or clear grating slits alternately spaced between a corresponding plurality of opaque bars. Each of the slits and bars which form the first information bit has a width, designated W. The width W of the grating slits and bars is preferably small for high resolution, but is otherwise limited by the diffraction characteristics thereof and by the minimum practical spacing between masks 50 and 60. By way of example, it is desirable that the width W be a relatively small number of wavelengths of the incident light that is transmitted from source 44. The second information bit of mask 50 also includes a plurality of open or clear grating slits alternately spaced between a corresponding plurality of opaque bars. However, each of the slits and bars which form the second information bit has a respective width, designated 2W, which width is equivalent to twice that of the slits and bars which form the first information bit. As will be recognized by those skilled in the art, the third, fourth and fifth information bits which form the mask 50 each comprise a respective plurality of alternate grating slits and bars. However, the respective widths of the slits and bars of the third, fourth and fifth information bits increase geometrically relative to one another. That is, each of the slits and bars that form the third information bit has a width, designated 4W, which width is equivalent to four times that of the slits and bars that form the first information bit. Moreover, each of the slits and bars that form the fourth information bit has a width, designated 8W, which width is equivalent to eight times that of the slits and bars that form the first information bit. What is more, each of the slits and bars that form the fifth information bit has a width, designated 16W, which width is equivalent to sixteen times that of the slits and bars that form the first information bit. Therefore, as will be disclosed hereinafter, the information bits formed in mask 50 are adapted to provide a sequence of binary weighted output signals that are indicative of the acceleration forces applied to substrate 48.

Referring concurrently to FIGS. 4 and 5b, the mask 60 formed on the stationary substrate 58 is described in detail. The first end of each of the fiber cores 54-1 . . . 54-5 from the bundle 52 thereof are securely attached to the transparent substrate 58 so as to receive light signals that are transmitted thereto via fiber cores 38 and masks 50 and 60. Thus, one bit of output information is produced in each optical fiber 54-1 . . . 54-5. For convenience, only five fiber cores 54-1 . . . 54-5 and five corresponding information bit positions are illustrated. However, it is to be understood that the mask 60 is adapted to accommodate any suitable number of fibers (e.g. 6 to 10) and corresponding bit positions that form the bundle of fiber rods 52.

The mask 60 is provided with adjacent arrays of gratings, each grating comprising alternate open or clear slits and opaque bars that are sufficient in number to cover each of the ends of the fiber optic cores 54-1 . . . 54-5 connected to stationary substrate 58. Each array of grating slits and bars corresponds to an information bit position in mask 60. Each of the grating slits and bars that form the first information bit of mask 60 has a width, designated W, which width is equivalent to that of the slits and bars that form the first information bit of mask 50. Each of the grating slits and bars that form the second information bit of mask 60 has a width, designated 2W, which width is equivalent to twice that of the slits and bars that form the first information bit of mask 60. As will be understood by those skilled in the art, each of the grating patterns of mask 60 that comprise the first and second information bits cover approximately 50 percent of the respective fibers 54-1 and 54-2. Since the widths of only a pair of grating bars and a single slit positioned therebetween are required to cover an equivalent 50 percent of the ends of fiber cores 54-3, 54-4 and 54-5 corresponding to the respective second, third and fourth information bits, each of the slits and bars which form the third, fourth and fifth information bits has the same width, designated 4W, which width is equivalent to twice that of the slits and bars that form the second information bit of mask 60. Thus, the peak light intensity is the same at every information bit position.

Figure 5C:
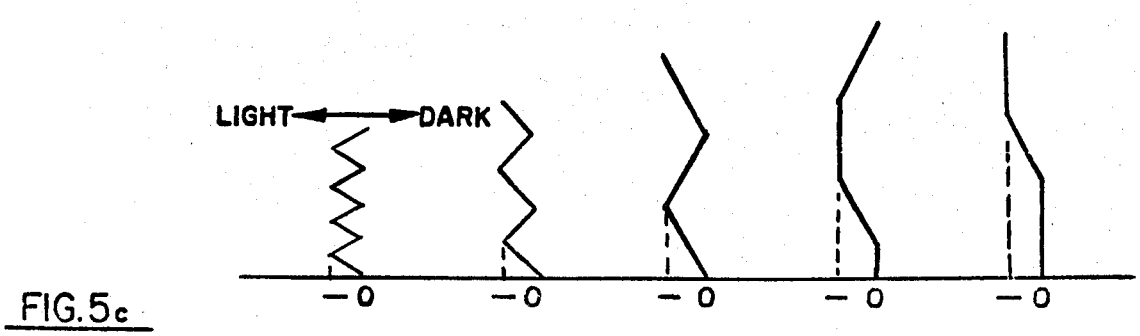
FIG. 5c shows the changing light intensity patterns as the movable mask illustrated in FIG. 5a moves relative to the stationary mask illustrated in FIG. 5b in accordance with input acceleration forces.

In operation, the center lines of the opposing movable and stationary masks 50 and 60 are initially aligned coincidentally with one another so that all of the grating slits formed in mask 60 are covered by the bar portions of mask 50. Hence, the resulting digital output signal is Gray coded 00000. When acceleration forces are applied to spring member 46 and, as a result, to the substrate 48, the position of mask 50 changes relative to that of mask 60. The dimensions of spring member 46 are selected to reduce cross-coupling effects between the masks 50 and 60. Hence, the intensity of the light received by the ends of the fiber cores 54-1 . . . 54-5 through mask 60 accordingly changes with the position of mask 50, as indicated in FIG. 5c of the drawings. The particular threshold light intensity which results in a transition between dark to light (i.e. 0 to 1) for each information bit typically occurs at half the peak intensity. The electro-optic detectors and signal processing electronics that interface with masks 50 and 60 via the bundle of fiber rods 52 are responsive to the changing light intensity patterns illustrated in FIG. 5c to provide an accurate digital representation of the motion of mask 50 relative to stationary mask 60 and, therefore, to the acceleration forces applied to the accelerometer 30.

The first and second information bit positions of each of masks 50 and 60, where multiple grating bars formed therein work against one another, are considered the least significant bits of the Gray coded digital output signal. The third, fourth and fifth information bit positions, where the grating slits formed in mask 60 work against the larger grating bar pattern formed in mask 50, constitute the most significant bits of the Gray coded digital output signal. By virtue of the masking configuration illustrated in FIGS. 5a and 5b, the gratings of multiple slits and bars which define the least significant information bit positions provide adequate illumination during that time when the input acceleration forces that are applied to spring member 46 cause the output signal to change rapidly, while a single slit pattern would, otherwise, only provide relatively dim illumination. Moreover, as shown in FIG. 5c, the single slit pattern of mask 60 that is used to define the most significant information bit positions produces sufficiently rapid output signal change at the point of transition from 0 to 1 output state, so that errors in the output signal are substantially eliminated. More particularly, the rate of change of light intensity with respect to the position of mask 50 is maximized. In each of the light intensity patterns of FIG. 5c corresponding to the most significant third, fourth and fifth information bits, the rate of change of light intensity relative to mask position is identical.

It will be apparent that although a preferred embodiment of the invention has been shown and described, various modifications and changes can be made without departing from the true spirit and scope of the invention.

Having thus set forth a preferred embodiment of the present invention, what is claimed is:

1. An optical accelerometer comprising:
   movable grid means adapted to move in response to an input mechanical force applied thereto, said movable grid means including an array of rows, each of said rows having therein a pattern of alternating transparent and opaque areas,
   first light transmission means to transmit incident light signals from a source thereof to each of the rows of said movable grid means,
   stationary grid means fixedly positioned adjacent said movable grid means for receiving light signals that are transmitted through the transparent areas thereof, said stationary grid means including an array of rows, each of said rows having therein a pattern of alternating transparent and opaque areas, and
   detector means positioned to receive output light signals that are transmitted through transparent areas of said movable and stationary grid means, the intensity of the output light signals received by said detector means being indicative of the position of said movable grid means and the magnitude of the mechanical force being applied thereto,
   the transparent and opaque areas that form the patterns of at least some of the rows of each of said movable and stationary grid means having a respective dimension which varies from row to row relative to one another.

2. The optical accelerometer recited in claim 1, wherein said first light transmission means comprises at least one optical fiber.

3. The optical accelerometer recited in claim 1, further comprising a light focusing means to focus the incident light signals that are transmitted by said first light transmission means upon each of the rows that forms said movable grid means.

4. The optical accelerometer recited in claim 1, further comprising second light transmission means to supply the output light signals to said detector means.

5. The optical accelerometer recited in claim 4, wherein said second light transmission means includes a plurality of optical fibers, each of said optical fibers being interfaced with a respective row of transparent and opaque areas that forms said stationary grid means, so that the output light signals that are transmitted to said detector means via said optical fibers are in a form for providing a binary representation of the input mechanical force.

6. The optical accelerometer recited in claim 5, wherein the transparent and opaque areas that form the rows of said stationary grid means are particularly dimensioned relative to one another, so that the maximum intensities of the output light signals that are respectively transmitted by said plurality of optical fibers to said detector means are substantially identical to one another.

7. The optical accelerometer recited in claim 1, wherein said movable grid means is interconnected with a resilient spring means that is adapted to oscillate in response to the input mechanical force.

8. The optical accelerometer recited in claim 1, wherein the respective patterns of transparent and opaque areas that form some other of the rows of said stationary grid means are substantially identical to one another.

9. The optical accelerometer recited in claim 1, wherein the transparent and opaque areas that form the patterns of certain successive rows of each of said movable and stationary grid means have a respective dimension which increases according to a particular mathematical relationship from row to successive row.

10. The optical accelerometer recited in claim 9, wherein the magnitude ($W_n$) of the respective dimension of a transparent or opaque area that forms the nth row of said successive rows of said movable or stationary grid means is determined according to the relationship:

$$W_n = A(2^{n-1});$$

where A is the magnitude of the corresponding dimension of a transparent or opaque area that forms the first of said successive rows of said movable or stationary grid means.

11. An accelerometer for providing a digital representation of an input mechanical force that is applied thereto, said accelerometer including:
movable and stationary grid means positioned in substantially adjacent and parallel alignment with one another, said movable grid means being adapted to move relative to said stationary grid means in response to the input mechanical force,
each of said movable and stationary grid means having certain rows comprising alternating transparent and opaque areas, the dimensions of each of the transparent and opaque areas that form a respective row of said certain rows of said movable and stationary grid means being identical with respect to one another, and the dimensions of the transparent and opaque areas that form a particular row of said certain rows being different from the dimensions of the transparent and opaque areas that form a succeeding row thereof,
light source means positioned to supply incident light signals to said movable and stationary grid means, and
detector means positioned to receive output light signals that are transmitted through transparent areas of said movable and stationary grid means, the intensity of the output light signals received by said detector means being indicative of the position of said movable grid means and providing a binary representation of the input mechanical force.

12. The accelerometer recited in claim 11, wherein a respective dimension of the transparent and opaque areas that form said certain rows of each of said movable and stationary grid means increases according to a particular mathematical relationship from row to successive row.

13. The accelerometer recited in claim 11, further including a plurality of optical fibers,
each of said optical fibers being positioned between a respective row of said stationary grid means and said detector means for supplying to said detector means the output light signals that are transmitted through transparent areas of said movable and stationary grid means.

14. The accelerometer recited in claim 13, wherein the transparent and opaque area that form the rows of said stationary grid means are particularly dimensioned relative to one another, so that the maximum intensities of the output light signals that are respectively transmitted by said plurality of optical fibers to said detector means are substantially identical to one another.

* * * * *